United States Patent
Hahn et al.

(10) Patent No.: US 10,003,957 B2
(45) Date of Patent: Jun. 19, 2018

(54) METHOD AND APPARATUS FOR SUPPORTING LOCATION PRIVACY PROTECTION IN WIRELESS ACCESS SYSTEM SUPPORTING SMALL CELL ENVIRONMENT

(71) Applicant: LG ELECTRONICS INC., Seoul (KR)

(72) Inventors: Genebeck Hahn, Seoul (KR); Jaehoon Chung, Seoul (KR); Eunjong Lee, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days. days.

(21) Appl. No.: 15/531,394

(22) PCT Filed: Nov. 27, 2014

(86) PCT No.: PCT/KR2014/011475
§ 371 (c)(1),
(2) Date: May 26, 2017

(87) PCT Pub. No.: WO2016/085001
PCT Pub. Date: Jun. 2, 2016

(65) Prior Publication Data
US 2017/0318452 A1    Nov. 2, 2017

(51) Int. Cl.
*H04W 4/00* (2018.01)
*H04W 8/20* (2009.01)
(Continued)

(52) U.S. Cl.
CPC ............... *H04W 8/20* (2013.01); *H04W 8/26* (2013.01); *H04W 88/02* (2013.01)

(58) Field of Classification Search
CPC ....... H04W 4/005; H04W 4/02; H04W 60/00; H04W 68/02; H04W 76/02; H04W 8/082; H04W 8/22; H04W 36/14
(Continued)

(56) References Cited

U.S. PATENT DOCUMENTS

| 2010/0087193 A1 | 4/2010 | Bishop et al. |
| 2011/0223887 A1* | 9/2011 | Rune .................... H04L 63/101 455/411 |

(Continued)

FOREIGN PATENT DOCUMENTS

KR    1020140019548    2/2014

OTHER PUBLICATIONS

PCT International Application No. PCT/KR2014/011475, Written Opinion of the International Searching Authority dated Aug. 27, 2015, 16 pages.

(Continued)

*Primary Examiner* — Joseph Arevalo
(74) *Attorney, Agent, or Firm* — Lee Hong Degerman Kang Waimey

(57) ABSTRACT

Embodiments of the present invention provide a method for allocating and updating an identifier in order to protect the location privacy of a user equipment (UE), and apparatuses for supporting the same. As an embodiment of the present invention, a method for protecting the location privacy of a UE in a wireless access system may comprise the steps of: receiving, from a mobility management entity (MME), an access acceptance message including a globally unique temporary identifier (GUTI) assigned so as not to expose an IMSI of the UE and update period information indicating an update period of the GUTI; determining whether to update the GUTI on the basis of the update period information; transmitting a GUTI update request message to the MME (Continued)

when the update period indicated by the update period information is reached; and receiving a GUTI update message including a new updated GUTI, in response to the GUTI update request message.

6 Claims, 8 Drawing Sheets

(51) Int. Cl.
  *H04W 8/26* (2009.01)
  *H04W 88/02* (2009.01)
(58) Field of Classification Search
  USPC ....... 455/456.1, 411, 436, 435.1, 458, 432.1, 455/434, 438, 522, 440, 408, 404.1, 558; 370/331, 250, 329, 401
  See application file for complete search history.

(56) References Cited

U.S. PATENT DOCUMENTS

| | | | |
|---|---|---|---|
| 2012/0189016 A1* | 7/2012 | Bakker | H04W 76/021 370/401 |
| 2014/0153408 A1* | 6/2014 | Jun | H04L 65/1066 370/250 |
| 2014/0204901 A1 | 7/2014 | Hedman et al. | |
| 2014/0219248 A1* | 8/2014 | Reddiboyana | H04W 76/025 370/331 |
| 2014/0295837 A1 | 10/2014 | Madasamy | |
| 2014/0302874 A1* | 10/2014 | Zakrzewski | H04W 8/22 455/456.1 |
| 2014/0321381 A1* | 10/2014 | Guo | H04W 52/0251 370/329 |
| 2016/0183156 A1* | 6/2016 | Chin | H04W 36/0022 370/331 |
| 2017/0257801 A1* | 9/2017 | Toth | H04W 64/003 |

OTHER PUBLICATIONS

Intel, "MME triggered re-direction to dedicated MME", SA WG2 Meeting #105, S2-143166, Oct. 2014, 3 pages.

* cited by examiner

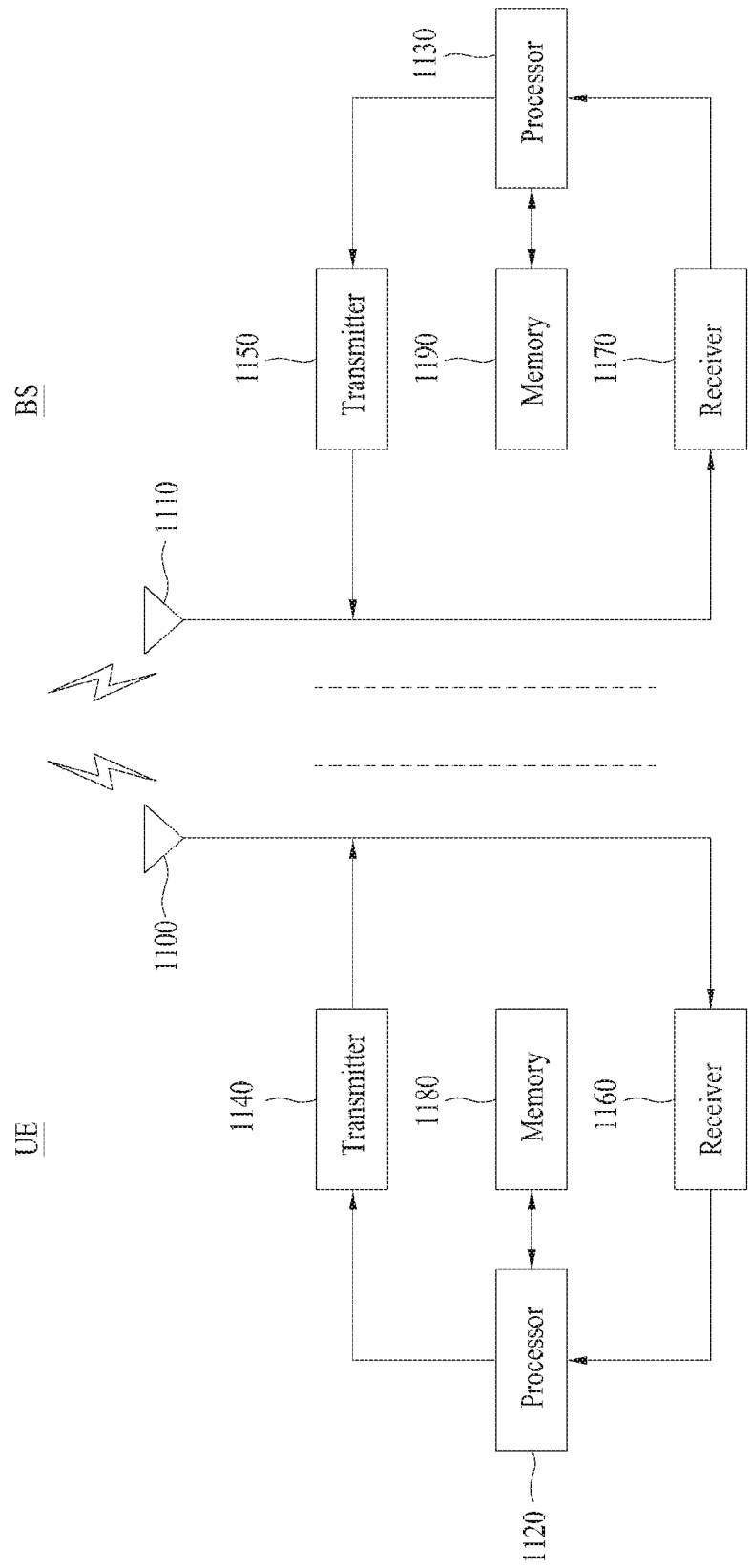

METHOD AND APPARATUS FOR SUPPORTING LOCATION PRIVACY PROTECTION IN WIRELESS ACCESS SYSTEM SUPPORTING SMALL CELL ENVIRONMENT

CROSS-REFERENCE TO RELATED APPLICATIONS

This application is the National Stage filing under 35 U.S.C. 371 of International Application No. PCT/KR2014/011475, filed on Nov. 27, 2014, the contents of which are all hereby incorporated by reference herein in its entirety.

TECHNICAL FIELD

The present invention relates to a wireless access system, and particularly, a method for allocating and updating an identifier in order to protect location privacy for a small-cell based user equipment (UE) service, and apparatuses for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Recently, the structure of a radio access system has changed to a structure in which small cells (e.g., pico cells, femto cells, etc.) having various shapes and small sizes are connected to a macro cell having a relatively large size. This aims to enable a user equipment (UE), which is an end user, to receive a high data rate to increase quality of experience in a state in which multilayered cells having vertical layers, in which conventional macro cells are fundamentally involved, are mixed.

According to one of the current $3^{rd}$ Generation Partnership Project (3GPP) standardization categories, Small Cell Enhancements for E-UTRA and E-UTRAN SI; e.g., RP-122033, enhancement of indoor/outdoor scenarios using low-power nodes is discussed under the title of small cell enhancement. In addition, scenarios and requirements for the small cell enhancement are described in 3GPP TR 36.932.

Considering the development trend, a larger number of smaller cells will be deployed within macro cells and thus final UEs will be located physically nearer to a network. Accordingly, it is expected that communication will be conducted through UE-based zones in a future-generation wireless access network, instead of conventional physical cell-based communication. To realize communication through UE-based zones with the aim of increasing throughput, technical issues should be handled to provide a service providing unit such as a UE zone, different from a conventional service providing unit such as a physical cell. The emergence of these small cells may significantly affect a current Remote Area Network (RAN).

Furthermore, the 5G system which is a future wireless communication system considers environments in which a lot of small cells are deployed. In such environments, handover among a remarkably large number of cells according to UE mobility is expected, compared to a macro eNB environment of LTE/LTE-A. Accordingly, interception of a UE identifier may be easier and thus protection of location information of a UE becomes increasingly important.

DISCLOSURE

Technical Problem

An object of the present invention devised to solve the problem lies in a method for protecting location information of a UE in a small cell environment.

Another object of the present invention is to provide a method for updating a temporary identifier used between a mobility management entity (MME) and a UE from among identifiers allocated to the UE.

Still another object of the present invention is to provide an apparatus supporting the methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To solve the aforementioned objects, embodiments of the present invention provide a method for allocating and updating an identifier in order to protect the location privacy of a UE and apparatuses supporting the same.

In an aspect of the present invention, a method for protecting location privacy of a UE in a wireless access system includes: receiving, from a mobility management entity (MME), an attachment acceptance message including a globally unique temporary identifier (GUTI) assigned so as not to expose an IMSI of the UE and update period information indicating an update period of the GUTI; determining whether to update the GUTI on the basis of the update period information; transmitting a GUTI update request message to the MME when the update period indicated by the update period information is reached; and receiving a GUTI update message including a new updated GUTI in response to the GUTI update request message.

Here, the GUTI may be equally used in a tracking area to which the MME belongs.

The attachment acceptance message may further include update condition information representing an update condition for the GUTI. Here, the method may further include: the UE determining whether the update condition of the GUTI is satisfied according to the update condition information; and transmitting a GUTI update request message to the MME corresponding to the update condition of the GUTI. Further, the update condition may be the number of changes of an ECGI (E-UTRAN Cell Global Identifier) for a predetermined time.

Here, the UE may be in an idle mode.

In another aspect of the present invention, a UE for protecting location privacy in a wireless access system includes: a transmitter; a receiver; and a processor for supporting protection of location privacy, wherein the processor is configured: to control the receiver to receive, from a mobility management entity (MME), an attachment acceptance message including a globally unique temporary identifier (GUTI) assigned so as not to expose an IMSI of the UE and update period information indicating an update period of the GUTI; to determine whether to update the GUTI on the basis of the update period information; to control the transmitter to transmit a GUTI update request message to the MME when the update period indicated by the update period information is reached; and to control the receiver to receive a GUTI update message including a new updated GUTI in response to the GUTI update request message.

Here, the GUTI may be equally used in a tracking area to which the MME belongs. Further, the attachment acceptance message may further include update condition information representing an update condition for the GUTI.

The processor may be further configured to determine whether the update condition of the GUTI is satisfied according to the update condition information and to transmit a GUTI update request message to the MME corresponding to the update condition of the GUTI using the transmitter. Here, the update condition may be the number of changes of an ECGI (E-UTRAN Cell Global Identifier) for a predetermined time. In this case, the UE may be in an idle mode.

The above-described aspects are merely parts of preferred embodiments of the present invention, and those skilled in the art can derive and understand various embodiments in which technical features of the present invention on the basis of detailed description of the present invention.

Advantageous Effects

Embodiments of the present invention have the following advantages.

First, it is possible to effectively protect location information of a UE in a small cell environment.

Second, it is possible to protect location information of a UE by providing a method of updating a temporary identifier (e.g., GUTI (Globally Unique Temporary Identifier)) that is used between an MME and the UE from among identifiers allocated to the UE and is not changed in a tracking area once allocated.

Third, a user can perform an authentication procedure without exposing the identifier of the user when initially attached to a network through the methods proposed in the embodiments of the present invention.

Fourth, a UE can actively determine when the UE will change the GUTI thereof by observing state variation thereof and the like such that the MME can update the GUTI in consideration of a mobility state that is difficult to predict per user in a high-density small cell environment.

Fifth, the embodiments proposed by the present invention are designed in consideration of limited battery capacity and computational capability of a UE and do not require complicated computations for the UE and the MME to update the GUTI.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings. That is, unintended effects according to implementation of the present invention can also be derived by those skilled in the art from embodiments of the present invention.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 shows a device for implementing the methods described with reference to FIGS. 1 to 10.

BEST MODE

Figure 1:
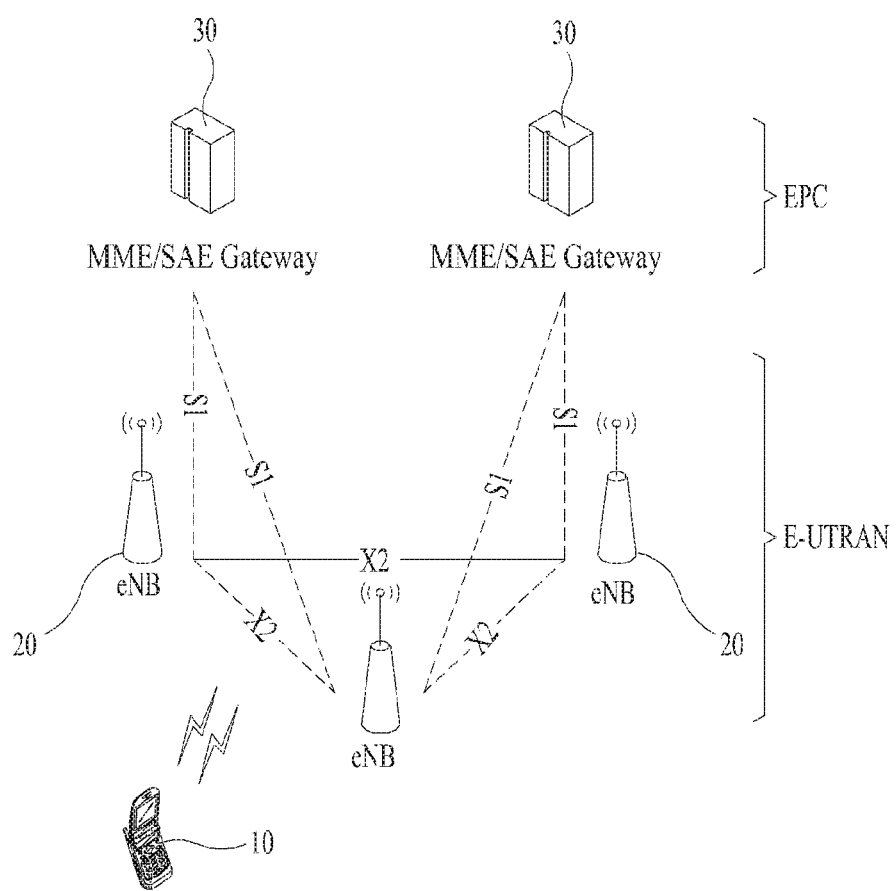
FIG. 1 illustrates a network configuration of an Evolved-Universal Mobile Telecommunication System (E-UMTS)

Embodiments of the present invention relate to a method for allocating and updating an identifier in order to support location privacy of a UE and an apparatus supporting the same.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the disclosure, 'include' or 'comprise' should be interpreted as that other components may further be included, not excluded, unless otherwise specified. The term '-unit', '-or (er)', 'module', etc. signifies at least one function or operation processing unit that can be implemented in hardware, software, or a combination thereof. In addition, it is to be understood that the singular forms 'a, 'an', and 'the' include plural referents unless the context clearly dictates otherwise.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). The UMTS is a 3rd Generation (3G) asynchronous mobile communication system operating in Europe system-based Wideband CDMA (WCDMA), GSM, and GPRS. 3rd Generation Partnership Project Long Term Evolution (3GPP LTE) is a part of Evolved UMTS (E-UMTS) using E-UTRA, adopting OFDMA for DL and SC-FDMA for UL. LTE-Advanced (LTE-A) is an evolution of 3GPP LTE.

While embodiments of the present invention are described in the context of a 3GPP LTE/LTE-A system in order to clarify the technical features of the present invention, the technical features of the present invention are not limited to the specific system. The following detailed description includes specific terms in order to provide a thorough understanding of the present invention. However, it will be apparent to those skilled in the art that the specific terms may be replaced with other terms without departing the technical spirit and scope of the present invention.

Terms used in embodiments of the present invention have the same meanings as defined in 3GPP TS 36.211, 36.212, 36.213, 36.321, 36.331 and/or 33.401 standard documents unless mentioned otherwise.

1. 3GPP LTE/LTE-A Network Configuration

The following description will be given of a network configuration available to a 3GPP LTE/LTE-A system to which embodiments of the present invention are applicable.

FIG. 1 illustrates a network configuration of an E-UMTS.

The E-UMTS is also called an LTE system. A communication network is deployed over a wide area and provides various communication services such as voice, Voice over Internet Protocol (VoIP) over IP Multimedia Subsystem (IMS), and packet data.

Referring to FIG. 1, an E-UMTS network includes an Evolved-UMTS Terrestrial Radio Access Network (E-UTRAN), an Evolved Packet Core (EPC), and one or more UEs. The E-UTRAN may include one or more eNBs 20 and one or more UEs 10 may be located within one cell. One or more E-UTRAN Mobility Management Entity (MME)/System Architecture Evolution (SAE) GateWays (GWs) 30 may be located at an end of the network and connected to an external network.

An eNB 20 provides user-plane and control-plane end points to a UE 10. An MME/SAE GW 30 provides an end point of a session and mobility management function to the UE 10. The eNB 20 and the MME/SAE GW 30 may be connected to each other via an S1 interface.

In general, the eNB 20 is a fixed station communicating with the UE 10, also called a BS or an access point. One eNB 20 may be deployed in each cell. An interface for transmitting user traffic or control traffic may be used between eNBs 20.

An MME performs various functions for the eNB 20, including Non-Access Stratum (NAS) signaling, NAS signaling security, Access Stratum (AS) security control, inter-Core Network (inter-CN) node signaling (including control and implementation of paging retransmission) for mobility between 3GPP access networks, idle-mode UE reachability, tracking area list management (for UEs in idle mode and active mode), Packet Data Network GateWay (PDN GW) and serving GW selection, MME selection for handover accompanied by MME switching, selection of a Serving GPRS Support Node (SGSN) for handover to a 2G or 3G 3GPP access network, roaming, authentication, bearer management including dedicated bearer establishment, Public Warning System (PWS) (including Earthquake and Tsunami Warning System (ETWS) and Commercial Mobile Alert System (CMAS)), and support of message transmission.

An SAE GW host provides various functions including per-user packet filtering (e.g. using a deep packet check), lawful interception, UE IP address allocation, transport-level packet marking on DL, UL and DL service-level billing, gating and rate enhancement, and Access Point Name-Aggregated Maximum Bit Rate (APN-AMBR)-based DL rate enhancement.

The MME/SAE GW 30 is referred to simply as a 'GW'. However, the MME/SAE GW 30 includes both an MME and an SAE GW.

A plurality of nodes may be connected between the eNB 20 and the GW 30 via an SI interface. eNBs 20 may be interconnected via an X2 interface and adjacent eNBs may form a mesh network having an X2 interface.

Figure 2:
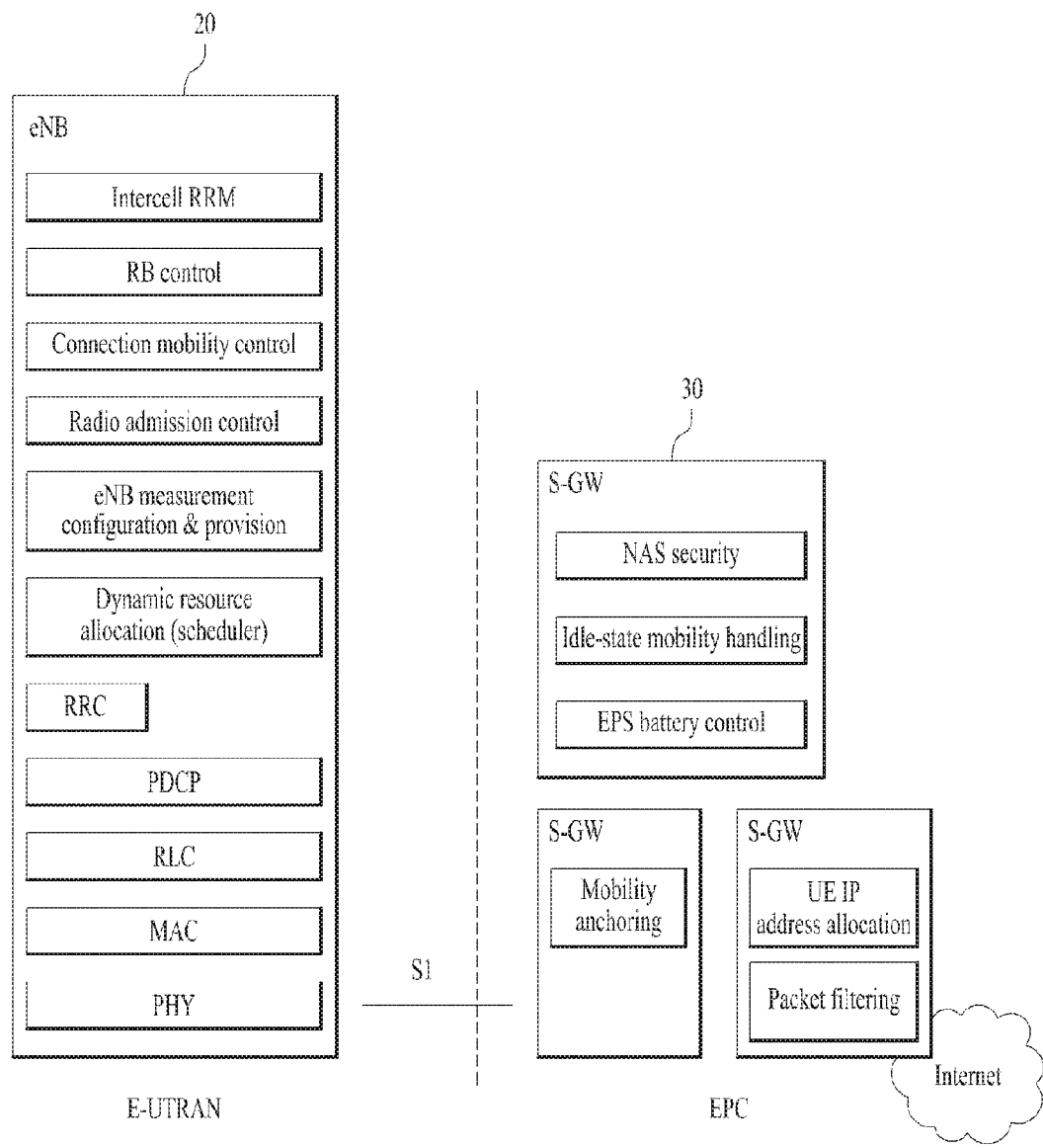
FIG. 2 is a block diagram of a general E-UMTS and a general GateWay (GW)

FIG. 2 is a block diagram of a general E-UTRAN and a general GW 30.

Referring to FIG. 2, the eNB 20 may perform functions such as selection of a GW 30, routing to the GW 30 during Radio Resource Control (RRC) activation, scheduling and transmission of a paging message, scheduling and transmission of Broadcast Control Channel (BCCH) information, dynamic DL and UL resource allocation to UEs 10, configuration and preparation of eNB measurement, radio bearer control, Radio Admission Control (RAC), and connection mobility control in LTE_ACTIVE state. In the EPC, the GW 30 may perform functions such as paging origination, LTE_IDLE state management, user-plane encryption, SAE bearer control, and cyphering and integrity protection for NAS signaling.

Figure 3:
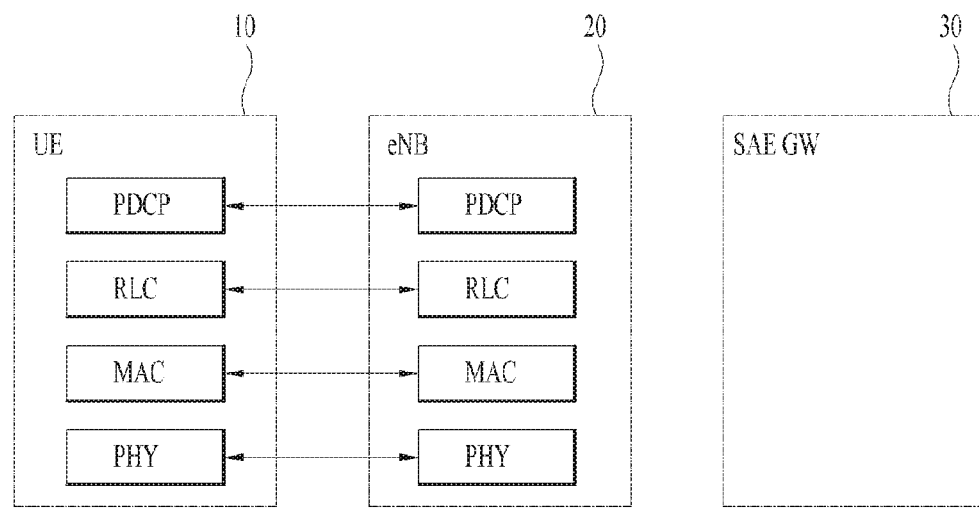
FIGS. 3 and 4 illustrate a user-plane protocol stack and a control-plane protocol stack for an E-UMTS, respectively.
Figure 4:
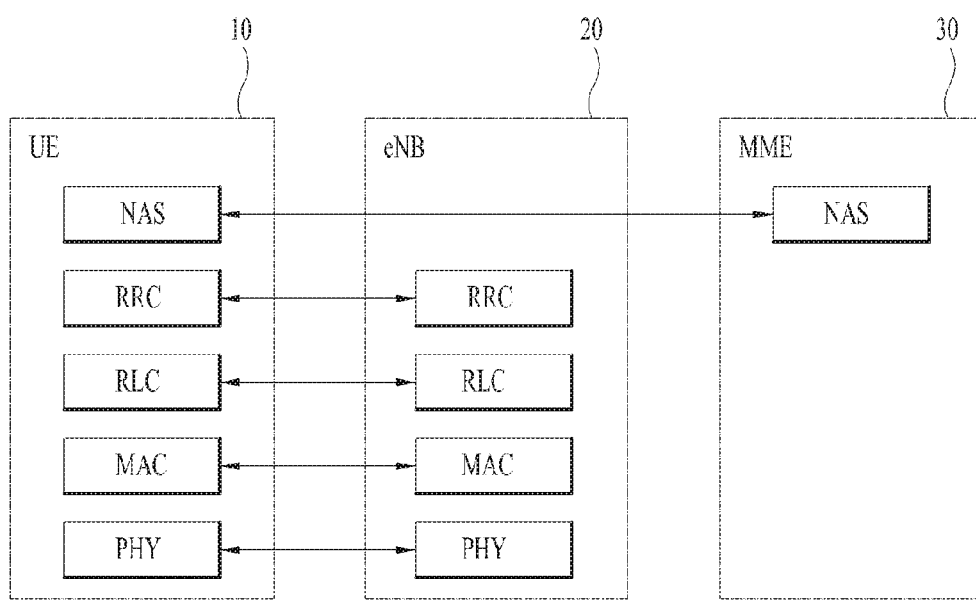

FIGS. 3 and 4 illustrate a user-plane protocol stack and a control-plane protocol stack for an E-UMTS.

Referring to FIGS. 3 and 4, protocol layers may be divided into Layer 1 (L1), Layer 2 (L2), and Layer 3 (L3) based on the lowest three layers of the Open System Interconnection (OSI) reference model known to the technical field of communication systems.

A PHYsical (PHY) layer, that is, L1 provides an information transfer service to a higher layer on physical channels. The PHY layer is connected to a Medium Access Control (MAC) layer above the PHY layer through transport channels and data is transmitted between the MAC layer and the PHY layer through the transport channels. Data is transmitted between different PHY layers such as the PHY layer of a transmitter and the PHY layer of a receiver on physical channels.

At L2, the MAC layer provides a service to its higher layer, Radio Link Control (RLC) through logical channels. The RLC layer of L2 supports reliable data transmission. While RLC layers are shown in FIGS. 3 and 4, if the MAC layer takes over RLC functionality, the RLC layer is not required.

A Packet Data Convergence Protocol (PDCP) layer of L2 performs a header compression function to reduce unnecessary control information. Thus, data may be efficiently transmitted in IP packets such as IP version 4 (IPv4) or IP version 6 (IPv6) packets via a radio interface having a relatively narrow bandwidth.

An RRC layer at the lowest part of L3 is defined only in the control plane and controls logical channels, transport channels, and physical channels in regards to configuration, reconfiguration, and release of Radio Bearers (RBs). An RB refers to a service provided by L2, for data transmission between the UE 10 and the E-UTRAN.

As illustrated in FIG. 3, the RLC layer and the MAC layer are terminated as the eNB 20 on the network side and may perform functions such as scheduling, Automatic Repeat reQuest (ARQ), and Hybrid ARQ (HARQ). The PDCP layer is terminated at the eNB 20 on the network side and may perform user-plane functions including header compression, integrity protection, and encryption.

Referring to FIG. 4, the RLC layer and the MAC layer are terminated at the eNB 20 on the network side and perform the same functions as control-plane functions. As illustrated in FIG. 4, the RRC layer is terminated at the eNB 20 on the network side and may control functions such as broadcasting, paging, RRC connection management, RB control, mobility, and measurement report and control of the UE 10. A NAS control protocol is terminated at an MME of the GW on the network side and may perform functions such as SAE bearer management, authentication, LTE_IDLE mobility handling, LTE_IDLE paging, and security control for signaling between the GW and the UE 10.

RRC states may be categorized into two different states, RRC_IDLE and RRC_CONNECTED.

In RRC_IDLE state, the UE 10 may receive broadcast system information and paging information during a Discontinuous Reception (DRX) cycle configured by the NAS. The UE 10 may be allocated an ID that uniquely identifies the UE 10 in a tracking area and may select or reselect a Public Land Mobile Network (PLMN). In the RRC_IDLE state, no RRC context is stored in an eNB.

In RRC_CONNECTED state, the UE 10 has an E-UTRAN connection and an RRC context used in the E-UTRAN and thus may transmit and/or receive data to and/or from the eNB. The UE 10 may also report channel quality information and feedback information to the eNB.

In the RRC_CONNECTED state, the E-UTRAN identifies a cell to which the UE 10 belongs. Therefore, the network may transmit and/or receive data to and/or from the UE 10, control UE mobility (handover and an order to change an inter-Radio Access Technology (inter-RAT) cell to a GSM EDGE Radio Access Network (GERAN) having a Network Assisted Cell Change (NACC)), and perform cell measurement on neighbor cells.

In the RRC_IDLE state, the UE 10 specifies a paging DRX cycle. Specifically, the UE 10 monitors a paging signal at a specific paging occasion in each specific paging DRX cycle.

Figure 5:
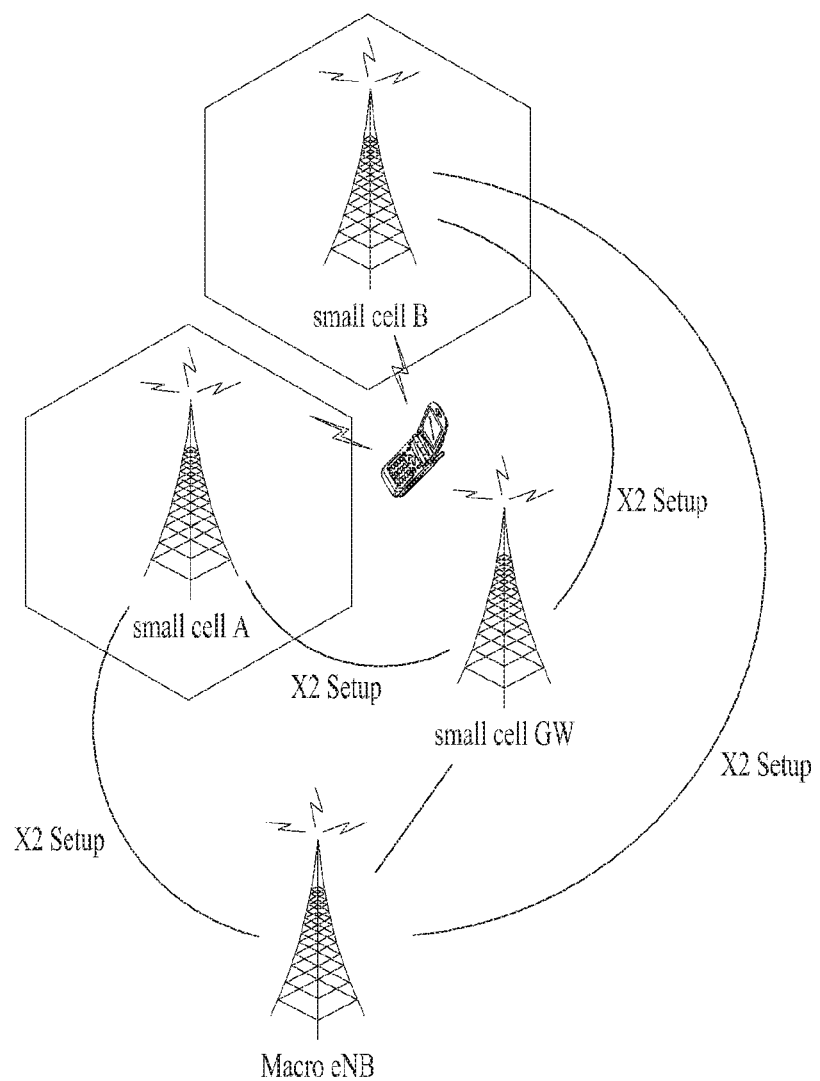
FIG. 5 illustrates an exemplary cell deployment to which embodiments of the present invention are applicable.

FIG. 5 illustrates an exemplary cell deployment to which embodiments of the present invention are applicable.

Referring to FIG. 5, two or more small cells may be deployed in the coverage of a macro eNB. The small cells may be managed and controlled by a small cell GW. In the present invention, the terms 'macro eNB' and 'macro cell' are interchangeably used in the same meaning. The macro cell may be connected to the small cell GW via an X2 interface.

FIG. 5 illustrates a scenario in which a macro cell may control small cells by interacting with the small cells. The macro cell may be connected to the small cells via direct interfaces or via indirect interfaces through the small cell GW.

2. Overview of Network Attachment Procedure

Figure 6:
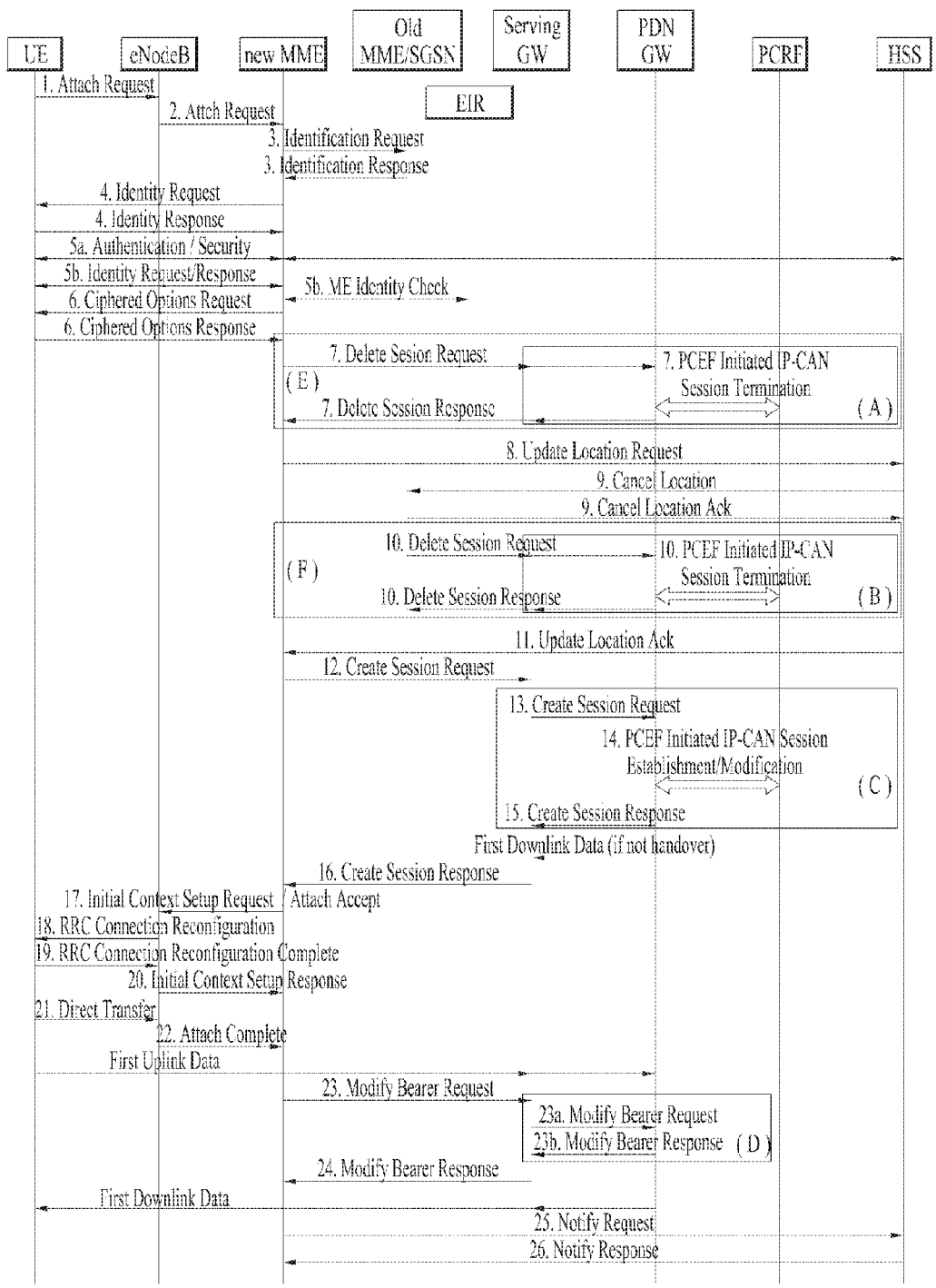
FIG. 6 is a flowchart illustrating an exemplary network attachment procedure in a Long Term Evolution/Long Term Evolution-Advanced (LTE/LTE-A) system.

FIG. 6 is a flowchart illustrating an exemplary network attachment procedure in an LTE/LTE-A system.

Referring to FIG. 6, a UE needs to register with a network to receive services that require registration. This registration is called network attachment. 'Always on IP connectivity' for the UE is enabled by establishing a default EPS bearer during a network attachment procedure. The network attachment procedure may trigger one or more dedicated bearer establishment procedures to establish a dedicated EPS bearer for that UE. During the network attachment procedure, the UE may request IP address allocation.

Now, a description will be given of the network attachment procedure with reference to FIG. 6. The network attachment procedure is performed in the following steps.

Step 1. The UE initiates the network attachment procedure by transmitting, to an eNode B, an Attach Request message including RRC parameters indicating the selected Network and an old Globally Unique Mobility Management Entity Identifier (GUMMEI).

The Attach Request message includes an International Mobile Subscriber Identity (IMSI) or an old GUTI, an Old GUTI type, a last visited TAI (if available), UE Core Network Capability, UE Specific DRX parameters, Attach Type, ESM message container (Request Type, PDN Type, Protocol Configuration Options, Ciphered Options Transfer Flag), KSIASME, a NAS sequence number, NAS-MAC, an additional GUTI, P-TMSI signature, Voice domain preference and UE's usage setting, and/or MS Network Capability parameters.

Step 2. The eNode B derives an MME from the RRC parameters carrying the old GUMMEI and the indicated selected network. If that MME is not associated with the eNode B or the old GUMMEI is not available, the eNode B selects a new MME. The eNode B forwards the Attach Request message to the new MME.

Step 3. If the UE identifies itself with a GUTI and the MME has changed since detach, the new MME uses the GUTI received from the UE to derive an old MME/SGSN address and transmits an Identification Request message to the old MME/SGSN to request the IMSI.

Upon receipt of the Identification Request message, the old MME/SGSN first verifies the Attach Request message and then responds to the new MME with an Identification Response message.

Step 4. If the UE is unknown to both the old MME/SGSN and the new MME, the new MME transmits an Identity Request message to the UE to request the IMSI. The UE responds to the new MME with an Identity Response message.

Step 5a. If no UE context for the UE exists anywhere in the network, if the Attach Request message transmitted in Step 1 was not integrity protected, or if the check of the integrity failed, then authentication and NAS security setup to activate integrity protection and NAS ciphering are mandatory. Otherwise it is optional. For example, if a NAS security algorithm is to be changed, the NAS security setup is performed in this step.

Step 5b. A Mobile Equipment (ME) identity should be retrieved from the UE. The ME identity should be transferred encrypted unless the UE performs an emergency attachment procedure and may not be authenticated.

Step 6. If the UE has set the Ciphered Options Transfer Flag in the Attach Request message, the Ciphered Options (i.e. PCO or APN or both) should be retrieved from the UE. Thus the new MME transmits a Ciphered Options request message to the UE and the UE transmits a Ciphered Options response message including an Access Point Name (APN) to the new MME.

Step 7. If there are active bearer contexts in the new MME for the UE, the new MME deletes these bearer contexts by transmitting a Delete Session Request message to a Serving Gateway (S-GW). The S-GW forwards the Delete Session Request message to a Packet Data Network (PDN) GW. If a Policy Control and Charging Rules Function (PCRF) is deployed, the PDN GW employs an IP-CAN session termination procedure to indicate that the bearer contexts have been released.

Step 8. If the MME has changed since the last detach, or if there is no valid subscription context for the UE in the MME, or if the UE provides an IMSI, the new MME transmits an Update Location Request message to a Home Subscriber Server (HSS). The Update Location Request message may include information such as an MME ID, an IMSI, an ME identity, MME capabilities, ULR-Flags, an IMS Voice over PS session supported Indication, UE Single Radio Voice Call Continuity (SRVCC) capabilities, etc.

Step 9. The HSS transmits a Cancel Location message to the old MME. The Cancel Location message includes the IMSI and Cancel Type. The old MME transmits a Cancel Location Ack messages including the IMSI and removes the MM and bearer contexts for the UE. If the ULR-Flags indicate "Initial-Attach-Indicator" and the HSS has the SGSN registration, then the HSS transmits a Cancel Location message to the old SGSN.

Step 10. If there are active bearer contexts in the old MME/SGSN for the UE, the old MME/SGSN deletes these bearer contexts by transmitting a Delete Session Request message to the GW. The GW transmits a Delete Session Response message to the old MME/SGSN. If a PCRF is deployed in the network, the PDN GW performs an IP CAN session termination procedure to indicate that the bearer contexts have been released.

Step 11. The HSS acknowledges the Update Location message by transmitting an Update Location Ack message to the new MME. The Update Location Ack message may include the IMSI and subscription data. The subscription data contains one or more PDN subscription contexts. Each PDN subscription context includes an 'EPS subscribed QoS profile' and a subscribed Access Point Name-Aggregated Maximum Bit Rate (APN-AMBR).

Step 12. The new MME selects an S-GW and allocates an EPS Bearer identity for the default bearer associated with the UE. Then the new MME transmits a Create Session Request message to the selected S-GW. The Create Session Request message may include IMSI, MSISDN, MME TEID for the control plane, DPN GW Address, PDN Address, APN, RAT Type, default DPS bearer QoS, PDN type, APN-AMBR, EPS Bearer Identity, Protocol Configuration Options, Handover Indication, ME Identity, User Location Information (ECGI), UE Time Zone, User CSG Information, an MS info change reporting support indication, Selection Mode, Charging Characteristics, Trace Reference, Trace Type, Trigger ID, Operation and Maintenance Center (OMC) Identity, Protocol Type over S5/S8, and Serving Network.

For emergency attachment, the MME applies parameters from MME Emergency Configuration Data for the emergency bearer establishment performed in this step.

If a subscribed PDN address is allocated to the UE for this APN, the PDN subscription context includes the UE's IPv4 address and/or IPv6 prefix and optionally a PDN GW identity. If the PDN subscription context includes a subscribed IPv4 address and/or IPv6 prefix, the new MME indicates the PDN subscribed context in the PDN address.

Step 13. Upon receipt of the Create Session Request message, the S-GW creates a new entry in its EPS bearer table and transmits the Create Session Request message to the PDN GW indicated by the PDN GW address received in the previous step. After this step, the S-GW buffers any DL packets received from the PDN GW.

Step 14. If a dynamic PCC is deployed and a Handover Indication is not present, the PDN GW performs an IP-CAN session establishment procedure, thereby obtaining a default PCC rule for the UE. This may lead to the establishment of a number of dedicated bearers.

The IMSI, APN, UE IP address, User Location Information (ECGI), UE Time Zone, Serving Network, RAT type, APN-AMBR, and Default EPS Bearer QoS are provided to the PCRF by the PDN GW. The User Location Information and UE Time Zone are used for location-based charging.

Step 15. The PDN GW creates a new entry in its EPS bearer context table and generates a Charging Id. The new entry allows the PDN GW to route user plane PDUs between the S-GW and the PDN. The PDN GW transmits a Create Session Response message to the S-GW. Create Session Response message includes PDN GW address for the user-plane, PDN GW TEID for the user plane, PDN GW TEID for the control plane, PDN type, PDN Address, EPS Bearer Identity, EPS Bearer QoS, Protocol Configuration Options. Charging ID, Prohibited Payload Compression, APN Restriction, Cause, MS Info Change Reporting Action (Start), CSG Information Reporting Action (Start), and APN-AMBR.

Step 16. The S-GW transmits the Create Session Response message to the new MME. If The MS Info Change Reporting Action (Start) and/or the CSG Information Reporting Action (Start) are received for this bearer context, the S-GW should store the information for the bearer context and report to the PDN GW that the UE's location and/or the User CSG information change has occurred.

Step 17. If an APN Restriction is received, the new MME stores this value for the bearer context and checks this received value with a stored value for a Maximum APN Restriction to ensure there are no conflicts between the values. If the bearer context is accepted, the new MME determines a new value for the Maximum APN Restriction. The new MME transmits an Attach Accept message to the eNode B. The Attach Accept message includes APN, GUTI, PDN Type, PDN Address, TAI List, EPS Bearer Identity allocated to the UE, Session Management Request, Protocol Configuration Options, NAS Sequence Number, NAS-MAC, IMS Voice over PS Session Support Indication, Emergency Service Support Indication, and LCS Support Indication.

The Attach Accept message is contained in an S1_MME control message Initial Context Setup Request. The S1 control message also includes AS security context information for the UE, the Handover Restriction List, the EPS Bearer QoS, the UE-AMBR, EPS Bearer Identity, as well as the TEID at the S-GW used for the user plane, and the address of the S-GW for the user plane.

Step 18. The eNode B transmits an RRC Connection Reconfiguration message including the EPS Radio Bearer Identity to the UE, and the Attach Accept message is transmitted along to the UE. The UE stores QoS Negotiated, Radio Priority, Packet Flow Id, and TI received in a Session Management Request message. The APN is provided to the UE to notify it of the APN for which the default bearer is associated. The UE provides EPS Bearer QoS parameters to an application handling a traffic flow. The UE should not reject the RRC Connection Reconfiguration message on the basis of the EPS Bearer QoS parameters included in the Session Management Request message.

Step 19. The UE transmits an RRC Connection Reconfiguration Complete message to the eNode B.

Step 20. The eNode B transmits an Initial Context Response message to the new MME. The Initial Context Response message includes the TEID of the eNode B and the address of the eNode B used for DL traffic on an S1_U reference point. The new MME should be prepared to receive Initial Context Response message either before or after an Attach Complete message.

Step 21. The UE transmits a Direct Transfer message to the eNode B, which includes the Attach Complete message with the EPS Bearer Identity, the NAS sequence number, and the NAC-MAC.

Step 22. The eNode B forwards the Attach Complete message to the new MME in a UL NAS Transport message. After the Attach Accept message and once the UE has obtained a PDN Address, the UE transmits UL packets to the eNode B which are tunneled to the S-GW and PDN GW.

Step 23. Upon receipt of both the Initial Context Response message in step 20 and the Attach Complete message in step 22, the new MME transmits a Modify Bearer Request message to the S-GW. The Modify Bearer Request message includes the EPS Bearer Identity, the eNode B address, the eNode B REID, and the Handover Indication.

Step 23a. If the Handover Indication is included in step 23, the S-GW transmits a Modify Bearer Request message to the PDN GW to prompt the PDN GW to tunnel packets from non 3GPP IP access to 3GPP access system and immediately starts routing packets to the S-GW.

Step 23b. The PDN GW acknowledges by transmitting a Modify Bearer Response message to the S-GW.

Step 24. The S-GW acknowledges by transmitting an Update Bearer Response message to the new MME. The S-GW may then buffer DL packets.

Step 25. After the new MME receives the Modify Bearer Response message, if Request Type does not indicate handover but indicates that an EPS bearer was established and the subscription data indicates that the user is allowed to perform handover to non-3GPP accesses, and if the MME selected a PDN GW that is different from the PDN GW identity which was indicated by the HSS in the PDN subscription context, the MME transmits a Notify Request message including the APN and PDN GW identity to the HSS. The message includes information that identifies the PLMN in which the PDN GW is located.

Step 26. The HSS stores the APN and PDN GW identity pair and transmits a Notify Response message to the new MME.

As described above, if a UE is to receive a service requiring registration, the UE may register to a network by performing the network attachment procedure illustrated in FIG. 6. That is, the UE may be allocated a dedicated EPS bearer in the network attachment procedure. In addition, steps indicated by dotted arrows are optional and steps indicated by solid arrows are mandatory in FIG. 6. The network attachment procedure of FIG. 6 is performed with one eNB (i.e. a macro eNB or a small cell eNB). On the other hand, embodiments of performing the network attachment procedure of FIG. 6 with a plurality of eNBs/cells will be described below.

3. Method of Protecting Location Privacy 3.1 Location Information

In a communication system, location information refers to information indicating the location of an individual for a specific time. In an environment of LTE/LTE-A which is a current commercial wireless access system, a large number of users are provided with many services based on location information thereof through smartphones and the like. Accordingly, location information is recognized as very sensitive information.

Up to now, issues related to protection of location information of a mobile communication user are not handled in depth in the LTE/LTE-A standards, which have been led by the 3GPP standardization group. This is because a UE authentication method adopted by the LTE/LTE-A standards is a successor to IMSI (International Mobile Subscriber Identity) based authentication adopted by second-generation and third-generation GSM mobile communication systems. That is, LTE/LTE-A have evolved from 2G/3G systems and thus have the weak point of the 2G/3G protocols, which relates to protection of IMSI that is a permanent identifier of a user, delivered through a wireless interface without protection.

Basically, the LTE/LTE-A standard compels use of a temporary identifier in order to satisfy requirements of location privacy of a UE to some extent. For example, a GUTI (Globally Unique Temporary Identifier) has been defined as a temporary identifier. However, the GUTI can be allocated and used only after user authentication is successfully completed when initial network access is performed.

The GUTI is a means by which a home network of a user who wants to access a serving network can be identified. However, when the serving network has no valid credentials for the user, the identifier of the user needs to be verified before a specific service is permitted for the user and identifier verification is performed upon request of the IMSI of the user. This means that the IMSI is delivered over the air (OTA) without protection. Further, the serving network acquires authentication information about the user and then delivers the GUTI for the user to the UE of the user upon successful authentication. The GUTI is composed of a GUMMEI (Globally Unique Mobility Management Entity Identifier) and M-TMSI (M Temporary Mobile Subscriber Identity) and the user is identified with an M-TMSI (32 bits) in an MME.

LTE/LTE-A is currently divided into a RAN (Radio Access Network) and a CN (Core Network). The RAN is in charge of all features related to a radio interface and serves as an entry point to a network for UEs. That is, the RAN provides encryption and integrity protection for user data and signaling traffic delivered over the air (OTA). The CN stores subscription information of users and provides functions of authenticating UEs and setting security keys through the subscription information. LTE provides services and a data rate superior to 2G and 3G networks on the basis of an All-IP core architecture. Furthermore, wireless network architectures have evolved into a form in which various small cells (pico, femto, etc.) interoperate with a macro cell (Refer to FIG. 5).

Such a trend aims to provide a higher data rate to a final user in a situation in which multi-layer cells in hierarchy coexist, in which a macro cell is involved. Accordingly, an extremely large number of small cells will be deployed in a network and thus final users will be further physically close in the network in a future-generation (5G) wireless communication environment in which small cells will play an important role. Therefore, protection of location information of users becomes very important because user-based connectivity will remarkably increase (hyperconnectivity).

In current wireless access systems, the core network (CN) takes the lead in security/privacy functions, such as authentication, security key setting, identifier management, etc. This is caused by the fact that communication paradigm is network-centric. As described above, a user-centric communication paradigm will be realized in a 5G wireless communication environment and thus it appears that demand for technology that can secure protection of location information of users will increase.

Embodiments of the present invention propose methods for protecting a GUTI, which is a temporary identifier allocated upon successful authentication of a user through IMSI.

3.2 IMSI and GUTI

An IMSI is a unique number related to each cellular phone user. The IMSI is stored in a USIM or SIM card inserted into a cellular phone and is transmitted from the cellular phone to a network. The IMSI is originally used to acquire information used in a PLMN. Further, the IMSI may be used for functions of calculating paging occasions (PO) in LTE/LTE-A.

That is, the IMSI is a globally unique identifier for identifying a mobile communication subscriber and is composed of a PLMN identifier and an MSIN. Here, the PLMN identifier is an identifier for globally identifying a common carrier and the MSIN is an identifier for identifying a subscriber UE in the corresponding common carrier.

The GUTI is a permanent identifier (e.g., IMSI) of a user in an EPS or an unambiguous identifier of a UE in order not to expose the UE. Further, the GUTI permits identification of an MME and a network. That is, the MME to which the UE is currently connected can be identified using the GUTI. In addition, the GUTI may be used to identify a UE during signaling between the UE and an eNB in an EPS.

The GUTI is an identifier temporarily used to protect an IMSI. When a UE includes an IMSI in an access request message when initially attached to an LTE/LTE-A network and transmits the access request message including the IMSI to the network (refer to the first step of FIG. 6), the MME allocates a GUTI value to the UE through an Attach Accept message. Then, the UE transmits the GUTI value instead of the IMSI to the network when the UE tries to re-attach to the network, and thus the GUTI value is used to identify the UE instead of the IMSI.

As described above, protection of a user identifier is a very important security issue for mobile communication users. Particularly, information about a permanent identifier (e.g., IMSI) allows malicious hackers to acquire a vast amount of information about individual users. When malicious hackers acquire information about users, various risks may be encountered, which may cause a big problem when sensitive services such as online banking, online shopping and the like are used through UEs.

Compared to LTE/LTE-A, 5G mobile communication systems are expected to orient to a higher-density small cell environment. Further, when mobile carriers actually install and operate indoor or outdoor small cells in high density, serious security threats may be generated. In the case of an indoor small cell, for example, an intruder accesses the small cell very easily and thus the small cell can be very easily manipulated by malicious users. Femto cells of Verizon, which is a mobile carrier in the U.S., have recently been hacked, and the fact that a SIM card can be used to expose the physical location of a subscriber has been reported.

That is, delivery of the IMSI which is a permanent identifier as clear-text in an attachment procedure through a small cell may destroy all security systems. This means that an eavesdropper can easily track the location of a corresponding user with higher accuracy and intercept an IMSI between the user and a small cell eNB and pose as the user.

Furthermore, since LTE/LTE-A mandatorily performs integrity protection for user data or control signaling but optionally applies protection through encryption, issues regarding user identifiers and location tracking still remain even if a temporary identifier called a GUTI is allocated to a user. This is because association between the IMSI and GUTI may be exposed to a malicious user and the GUTI is not changed in a tracking area (TA) including UEs, in general. Furthermore, since the TA may be composed of hundreds or thousands of small cells, a GUTI security problem is a more important issue.

3.3 GUTI Allocation Process

Referring to FIG. 6, a UE needs to perform an attachment procedure in order to perform initial authentication with a network. Here, an Attach Request message delivered from the UE to an MME through an eNB through RRC signaling includes and carries an IMSI which is a permanent identifier of the user without protection because the user has no temporary identifier during initial attachment.

Figure 7:
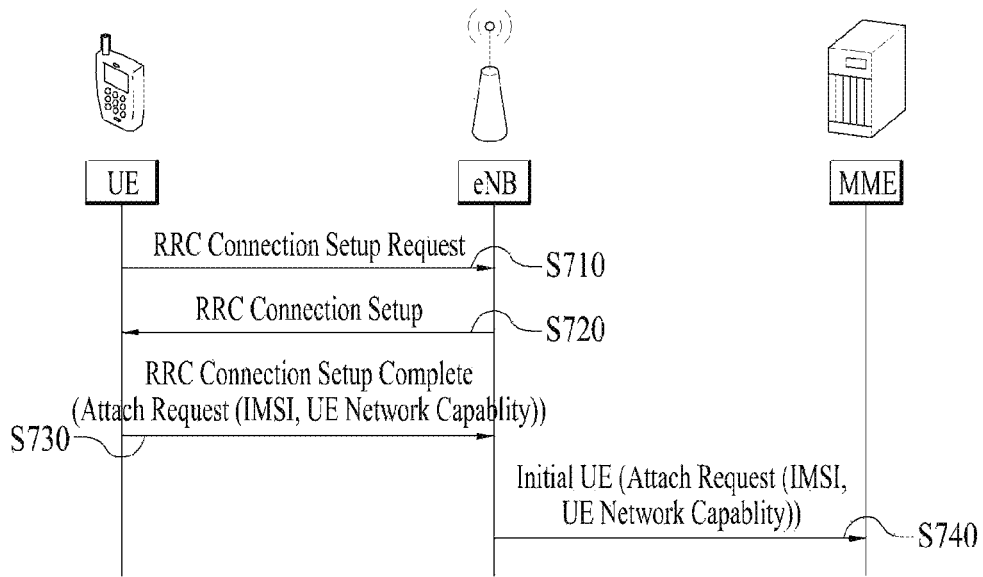
FIG. 7 illustrates the attachment procedure of FIG. 6 from the viewpoint of RRC.

This is described with reference to FIG. 7. FIG. 7 illustrates the attachment procedure from the viewpoint of RRC. Referring to FIG. 7, no entity has a context for the corresponding user before initial attachment from the viewpoint of a network, and the MME allocates a new temporary identifier, a GUTI, to the UE through NAS upon successful authentication of the UE. That is, the UE sets up RRC connection with the eNB for initial network attachment (S710 and S720) and transmits an RRC Connection Setup Complete message to the eNB upon completion of RRC connection setup. Here, the RRC Connection Setup Complete message includes an Attach Request message containing IMSI and UE network capability information (S730). Thereafter, the eNB delivers the Attach Request message to the MME (S740).

The MME allocates a new GUTI to the UE and then manages information on mapping between the IMSI and the GUTI. The MME allocates the GUTI in order to identify the corresponding UE without exposing the IMSI, which is the identifier of the UE, over the air (OTA) after allocation of the GUTI. That is, identification of the UE for connection setup (Attach Request, TAU, Service Request) through wireless paths after initial attachment is performed using the GUTI instead of the IMSI.

The GUTI is composed of a GUMMEI and an M-TMSI and has a globally unique value. The GUTI can be used to identify a UE instead of the IMSI. In addition, unlike the IMSI with fixed value, the GUTI is a temporary value allocated by the MME to the UE whenever the UE registers in the network and thus the burden of security is lessened even if the GUTI is exposed to a radio link.

However, the 5G mobile communication system, which will realize UE centric connectivity, aims at provision of the best communication coverage to users all the time irrespective of user location, which means that protection of user privacy is essential. That is, technical solutions for realizing user location privacy protection that needs to be enabled by the 5G mobile communication system need to be able to eliminate or control potential security risk factors of ubiquitous connectivity in order to protect personal data of users.

In LTE/LTE-A, the GUTI is updated only when network registration or tracking area update (TAU) is performed. Hence, a period and an area in which the GUTI is maintained are excessively long and wide in a small cell environment in spite of the fact that the GUTI is a temporary identifier used instead of the IMSI. Therefore, a static GUTI allocation method defined in LTE/LTE-A in order to protect user identifiers (e.g., GUTI) may be vulnerable to a 5G wireless communication environment having small cells in high density, and thus there is a need for a new method for solving such a problem.

4. GUTI Update Method

Embodiments of the present invention provide methods for overcoming restrictions on protection of location information with respect to a static temporary identifier (e.g., GUTI) which is acquired from an MME and used by a UE after successful completion of authentication of the UE in a 5G (future mobile communication system) wireless communication environment.

Embodiments of the present invention are based upon the premise that information about an IMSI is present only in a USIM and HSS of a UE as in LTE/LTE-A and the premise that information about mapping between an IMSI and a GUTI is managed by the MME. That is, the embodiments of the present invention secure privacy of end-to-end identifiers for UEs.

4.1 GUTI Update Method-1

A description will be given of a method by which the MME generates and updates a new GUTI and transmits the new GUTI to a UE such that the UE uses the new GUTI by setting a GUTI update condition while using the same GUTI configuration as that of LTE/LTE-A in the following embodiment.

(1) Method 1: The MME may signal a GUTI and information about an update period of the GUTI through an Attach Accept message.

(2) Method 2: The MME may change the update period of the GUTI allocated to the UE or signal a new GUTI and an update period of the new GUTI through a new NAS message instead of the Attach Accept message depending on mobility state of the UE in a connected state.

Figure 8:
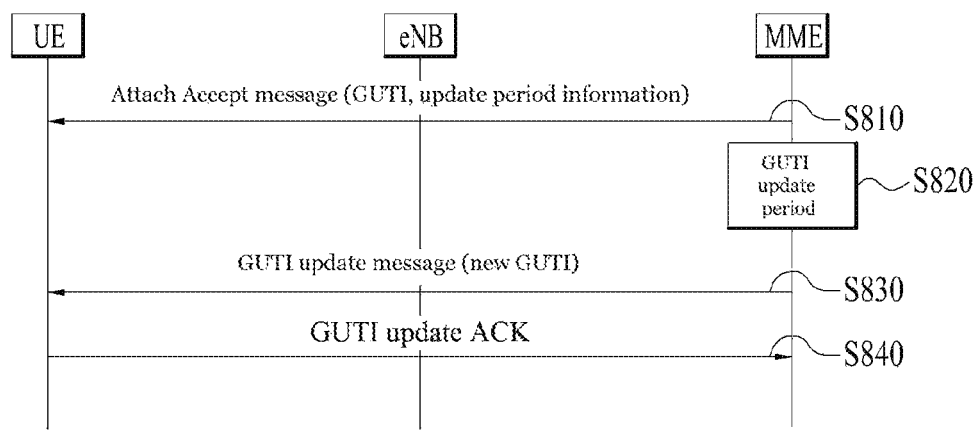
FIG. 8 illustrates a method of updating a GUTI.

FIG. 8 illustrates a method of updating a GUTI.

Referring to FIG. 8, the MME transmits, to a UE, an Attach Accept message including a GUTI allocated to the UE and update information indicating an update period of the allocated GUTI (S810).

The MME checks whether to update the GUTI on the basis of the GUTI update period information (S820).

When the GUTI update period expires in step S820, the MME transmits a GUTI update message including an updated new GUTI to the UE (S830).

The UE updates the previous GUTI to the new GUTI and then transmits, to the MME, a GUTI update ACK message indicating that GUTI update has been successfully performed (S840).

That is, the MME allocates a new GUTI and transmits the same to the UE in the set period and the UE transmits an ACK message for the GUTI to the MME and uses the new GUTI upon reception of the ACK message by the MME.

Figure 9:
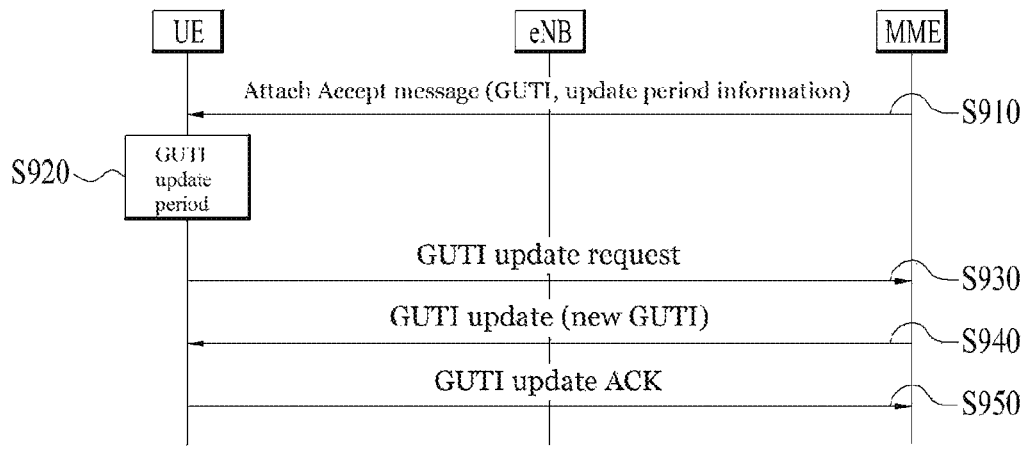
FIG. 9 illustrates another method of updating a GUTI.

FIG. 9 illustrates another method of updating a GUTI.

Referring to FIG. 9, the MME transmits, to a UE, an Attach Accept message including a GUTI and update information indicating an update period of an allocated GUTI (S910).

The UE checks whether to update the GUTI on the basis of the GUTI update period information (S920).

When the GUTI update period expires in step S920, the UE transmits a GUTI update request message to the MME in order to request a new GUTI (S930).

The MME allocates a new GUTI to the UE and transmits a GUTI update message including the new GUTI to the UE in response to the GUTI update request message (S940).

The UE updates the previous GUTI to the new GUTI and then transmits, to the MME, a GUTI update ACK message indicating successful GUTI update (S950).

That is, the UE sends a request for allocation of a new GUTI to the MME in the GUTI update period and the MME allocates a new GUTI to the UE and transmits the same to the UE. Then, the UE transmits an ACK message for the new GUTI to the MME and uses the new GUTI upon reception of the ACK message by the MME.

In FIGS. 8 and 9, an eNB delivers messages transmitted/received between the MME and the UE. That is, the eNB does not intervene in GUTI allocation and update. Furthermore, while messages described with reference to FIGS. 8 and 9 may be NAS messages of LTE/LTE-A, messages newly defined in 5G may be used.

The embodiments of FIGS. 8 and 9 are based on the assumption that the UE is located within the same TA. When the TA of the UE is changed, the UE may perform a TAU process, may be allocated a new GUTI by the MME and may use the new GUTI in a changed TA.

4.2 GUTI Update Method-2

A description will be given of a method by which the MME changes a GUTI update period or allocates a new GUTI depending on a UE mobility state before the GUTI update period expires.

For example, the MME may generate a new GUTI depending on a mobility state of a UE in a connected state and allocate the new GUTI to the UE before the update period of the GUTI allocated in FIG. 8 or FIG. 9 expires, and the UE may use the new GUTI by transmitting an ACK message for the new GUTI to the MME.

For example, the MME can set a shorter GUTI update period than the previously set GUTI update period and notify the UE of the shorter GUTI update period upon determining that the mobility state of the connected UE corresponds to a very fast state after S810 or S910. This is because the risk of exposure of the GUTI allocated to the UE increases due to increase in the number of small cells to which the UE moves in the TA when the UE has a high moving speed. Of course, the MME may reset the GUTI update period to a longer GUTI update period and notify the UE of the reset GUTI update period when the UE slowly moves.

Here, the number of cells into which the UE has moved within a predetermined time may be defined as an example of mobility state of the UE. Alternatively, the current absolute moving speed of the UE may be used as a mobility state. Of course, other values related to the speed of the UE may be used as a mobility state of the UE.

4.3 GUTI Update Method-3

The methods of allocating and updating a GUTI when a UE is in a connected state, that is, in the normal mode have been described in the aforementioned embodiments. Hereinafter, methods of allocating and updating a GUTI when a UE is in an idle state or idle mode will be described.

Embodiments which will be described below are based on the method described with reference to FIG. 9. For example, a UE sends a request for allocation of a new GUTI to the MME according to a GUTI update condition maintained by the UE while using the same GUTI configuration as that of LTE/LTE-A. Further, the MME may generate a new GUTI and transmit the new GUTI to the UE at the request of the UE such that the UE uses the new GUTI. This will be described in detail with reference to FIG. 10.

Figure 10:
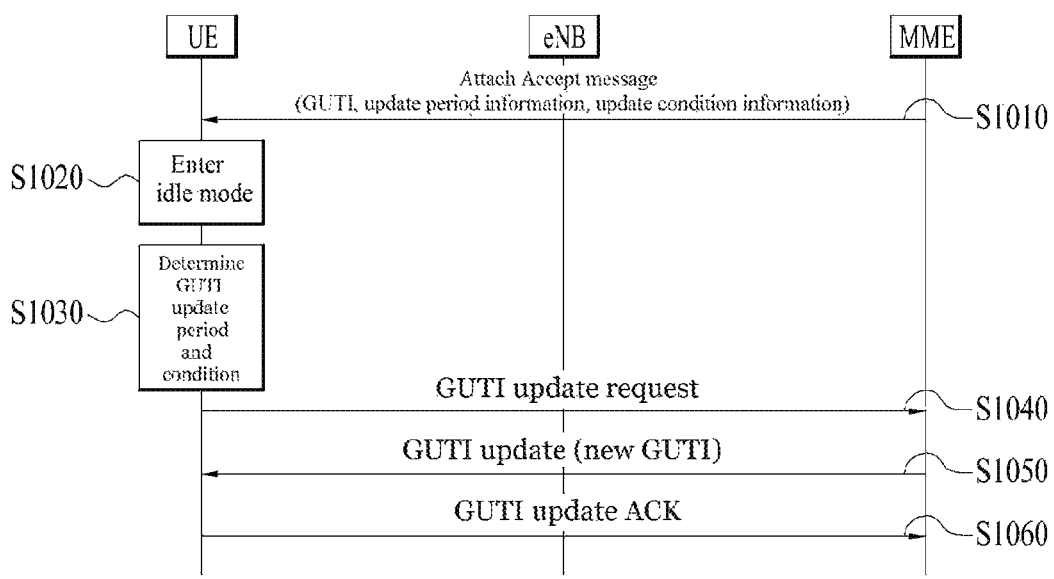
FIG. 10 illustrates a method of updating a GUTI of a UE in an idle mode.

FIG. 10 illustrates a method of updating a GUTI of an idle mode UE.

Referring to FIG. 10, the MME transmits an Attach Accept message including a GUTI and update information indicating a GUTI update period to the UE (S1010).

Then, the UE enters an idle mode (S1020).

The UE in the idle mode can determine whether to update the GUTI on the basis of the update period information on the GUTI allocated thereto and update condition information (S1030).

When the UE moves along the network in the idle mode instead of being in a connected state, the MME cannot detect the location of the UE per cell. That is, in order to solve a problem that the MME cannot detect mobility state of the UE in the idle mode, the UE may be set to maintain a GUTI update condition and to trigger GUTI update.

As an example of the GUTI update condition, the UE measures the number of changes of an ECGI (E-UTRAN Cell Global Identifier) that can be used as a cell identifier for a predetermined time and, when the number of changes of the ECGI exceeds a predetermined threshold value, sends a request for GUTI update to the MME. Of course, even when the GUTI update condition is not satisfied, the UE may transmit a GUTI update request message to the MME for GUTI update request when the GUTI update period expires (S1040).

In this case, predetermined threshold values of the GUTI update period information and GUTI update condition information maintained by the UE may be delivered from the MME to the UE using the Attach Accept message or a new NAS message, as described above.

The MME allocates a new GUTI to the UE in response to the GUTI update request message and transmits a GUTI update message including the new GUTI to the UE (S1050).

The UE updates the previous GUTI to the new GUTI and then transmits a GUTI update ACK message indicating successful GUTI update to the MME (S1060).

That is, the UE sends a request for allocation of a new GUTI to the MME in the set GUTI update period and the MME allocates and transmits a new GUTI to the UE. Then, the UE transmits an ACK message for the new GUTI to the MME and uses the new GUTI upon reception of the ACK message by the MME.

As illustrated in FIG. 10, the UE delivers a request for GUTI update to the MME such that the MME generates and allocates a new GUTI when a negotiated GUTI update condition is generated by the MME.

In another aspect of the present invention, the MME may change a GUTI update condition and notify the UE of the changed GUTI update condition along with a new GUTI when allocating the new GUTI to the UE. In steps S1040 to S1060, new NAS messages instead of previous NAS messages may be defined and exchanged between the UE and the MME. The MME uses the new GUTI upon reception of the ACK message for GUTI update from the UE.

The embodiments of the present invention have been created in terms of "UE centric" which is a key concept of 5G wireless communication. That is, it is possible to overcome (the above-described) restrictions that can be generated due to allocation of an infrequent and static temporary identifier (GUTI) in LTE/LTE-A. That is, a UE can dynamically determine when the GUTI thereof will be changed according to observation of state variation thereof to thereby reflect mobility state, which is difficult to predict per user in a high-density small-cell environment, in GUTI update.

GUTI update methods considering the 5G mobile communication system which will accept small higher density cells, compared to LTE/LTE-A, to protect privacy of a GUTI corresponding to a temporary identifier statically allocated and used by a UE in the same TA have been described in the present invention.

The proposed GUTI update methods include a method of setting a variable GUTI update period depending on mobility characteristics of a UE and a method of requesting GUTI update by the UE. A 5G mobile communication environment will accept a larger number of UE connections than a 4G LTE/LTE-A mobile communication environment and secure privacy for UE connections. That is, embodiments proposed by the present invention have been designed in consideration of limited battery and computational capability of UEs and do not require the MME and UEs to perform complicated computations for GUTI update.

5. Implementation Apparatuses

Apparatuses illustrated in FIG. 11 are means that can implement the methods described before with reference to FIGS. 1 to 10.

A UE may act as a transmission end on a UL and as a reception end on a DL. An eNB may act as a reception end on a UL and as a transmission end on a DL.

That is, each of the UE and the eNB may include a Transmission (Tx) module 1140 or 1150 and a Reception (Rx) module 1160 or 1170, for controlling transmission and reception of information, data, and/or messages, and an antenna 1100 or 1110 for transmitting and receiving information, data, and/or messages. Here, the antenna may be a massive antenna which refers to an antenna group in which a plurality of antennas is arranged in a two-dimensional or three-dimensional form.

Each of the UE and the eNB may further include a processor 1120 or 1130 for implementing the afore-described embodiments of the present disclosure and a memory 1180 or 1190 for temporarily or permanently storing operations of the processor 1120 or 1130.

Embodiments of the present invention may be performed using the components and functions of the aforementioned UE and the eNB. For example, the processor of the eNB or the UE may combine the methods described in sections 1 to 4 to perform the corresponding operations. In addition, the eNB may be replaced by an MME in FIG. 11. That is, the processor of the MME may generate an Attach Accept message including a GUTI, GUTI update period information and/or GUTI update condition information and transmit the Attach Accept message to the UE through an eNB using a transmitter. According to an embodiment, the processor of the UE or the MME may store the GUTI update period information and/or the update condition information and request GUTI update or update and allocate a GUTI when the corresponding period or condition is satisfied. Refer to sections 1 to 4 for details.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 11 may further include a low-power Radio Frequency (RF)/Intermediate Frequency (IF) module. Here, the Tx module and the Tx module may be called a transmitter and a receiver and may be called a transceiver when used together.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1180 or 1190 and executed by the processor 1120 or 1130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for protecting location privacy of a user equipment (UE) in a wireless access system, the method comprising:
    receiving, from a mobility management entity (MME), a first globally unique temporary identifier (GUTI);
    switching a serving cell to which the UE is connected when the UE moves;
    setting the connection with a switched serving cell using the first GUTI;
    measuring, when the serving cell is switched multiple times, a number of serving cell IDs received from switched serving cells for a predetermined time;
    transmitting a GUTI update request message to the MME if the measured number of the serving cell IDs exceeds a threshold value to limit a number of the switched serving cells using the first GUTI; and
    receiving, from the MME, a second GUTI in response to the GUTI update request message,
    wherein the UE is in an idle mode.

2. The method according to claim 1, wherein the first GUTI is maintained within a tracking area to which the MME belongs if the number of the serving cell IDs does not exceed the threshold value.

3. The method according to claim 1, wherein the serving cell IDs are received by being included in each ECGI (E-UTRAN Cell Global Identifier) corresponding to each of the multiple switched serving cells.

4. A UE for protecting location privacy in a wireless access system, comprising:
    a transmitter;
    a receiver; and
    a processor for supporting protection of location privacy, wherein the processor
        controls the receiver to receive, from a mobility management entity (MME), a first globally unique temporary identifier (GUTI);
        switches a serving cell to which the UE is connected when the UE moves;
        sets the connection with a switched serving cell using the first GUTI;
        measures, when the serving cell is switched multiple times, a number of serving cell IDs received from multiple switched serving cells for a predetermined time;
        controls the transmitter to transmit a GUTI update request message to the MME if the number of the serving cell IDs exceeds a threshold value to limit a number of the switched serving cells using the first GUTI; and controls the receiver to receive, form the MME, a second GUTI in response to the GUTI update request message, wherein the UE is in an idle mode.

5. The UE according to claim 4, wherein the first GUTI is maintained within a tracking area to which the MME belongs if the number of the serving cell IDs does not exceed the threshold value.

6. The UE according to claim 4, wherein the serving cell IDs are received by being included in each ECGI (E-UTRAN Cell Global Identifier) corresponding to each of the switched serving cells.

\* \* \* \* \*